United States Patent Office 2,931,106
Patented Apr. 5, 1960

2,931,106

PROCESS FOR THE PREPARATION OF IMPROVED POLYTETRAFLUOROETHYLENE EXTRUSION POWDER

David R. Campbell, Shelbyville, Ind., assignor to E. I. du Pont de Nemours and Company, Wilmington, Del., a corporation of Delaware No Drawing. Application August 14, 1958
Serial No. 754,933

2 Claims. (Cl. 34—30)

The process of the present invention relates to the preparation of polytetrafluoroethylene extrusion powder, and more particularly to the preparation of polytetrafluorethylene powder by improved drying techniques.

It is well known that polytetrafluoroethylene is difficult to fabricate into various shapes by techniques applicable to most plastics. Although polytetrafluoroethylene has a crystalline melting point at 327° C. above which the polymer powder can be coalesced and sintered into continuous shapes, it does not become fluid and deformable as the usual crystalline, thermoplastic polymers above their crystalline melting point, but retains its shape and forms a brittle gel which can only be worked with difficulty. Consequently, special extrusion techniques were developed for polytetrafluoroethylene in which the powder is formed into the desired shape which is subsequently sintered and coalesced. One method of extruding polytetrafluoroethylene involves prebaking finely divided polymer and then passing the polymer through a die having the size and shape of the desired finished article, and sintering the article while passing through the die. A greatly improved method was developed when it was discovered that tetrafluoroethylene could be polymerized in an aqueous medium to give rise to a dispersion of polytetrafluoroethylene. The dispersion is coagulated, the coagulated polymer is dried and is then combined with a liquid hydrocarbon lubricant. The lubricated polymer is then passed under pressure through a die having the size and shape of the desired article under conditions such that the lubricant is not volatilized. The resulting preform is dried, the lubricant is removed, and the preform is then heated at a temperature above 327° C. to sinter the polymer into the final shape. In contrast to previously obtained polymer, the polymer obtained on coagulation of aqueous dispersions gives rise, at high and uniform rates, to an extruded unsintered preform having great strength and toughness which can be sintered to impermeable, flawless articles. This method of extruding polytetrafluoroethylene, generally called "paste extrusion," is described in greater detail in U.S. Patent 2,685,707, issued to W. E. Llewellyn and J. F. Lontz on August 10, 1954. However, it had been found that the extrudability and the quality of the extrudate varied significantly from one polymerization to another and that some polymerizations gave rise to polymers which were relatively unsuitable for the extrusion of polytetrafluoroethylene in that they could not be extruded at even rates, that they required extremely high extrusion pressures, and on sintering formed extrudates which were cracked and of uneven strength causing early failure.

It is therefore one of the objects of the present invention to provide an improved polytetrafluoroethylene extrusion powder. It is another object to provide an extrusion powder which gives rise to high extrusion rates at low extrusion pressures. It is yet another object to provide an improved polymer drying process. Other objects will become apparent hereinafter.

The objects of the present invention are accomplished by a process which comprises drying a polytetrafluoroethylene powder obtained on coagulation from an aqueous polytetrafluoroethylene dispersion at a temperature of 120° to 170° C. within a period of less than 60 minutes in a continuous inert gas stream and preferably an air stream. In accordance with the present invention it was discovered that the method of drying employed for polytetrafluoroethylene powder obtained on coagulation of an aqueous dispersion thereof greatly determines the extrusion characteristics of the dried polymer powder. Thus, depending on the drying conditions employed, there may be obtained polymer which is highly suitable for the paste extrusion technique described hereinabove, or there may be obtained polymer powder which, when extruded by these techniques, requires higher extrusion pressures and thereby decreases the productivity of the process and results in articles which on sintering contain a large number of flaws such as cracks and fissures. Although the crystalline melting point of the polymer is above 300° C., it is believed that temperatures below 300° C. have a significant effect on the polymer powder structure. Thus it was found that the extrusion characteristics of the polymer powder could be greatly improved by drying of the polymer powder at lower temperatures and in shorter drying times. Heretofore the polytetrafluoroethylene polymer powder obtained on the coagulation of aqueous dispersions of the polymer was generally dried by heating the polymer at temperatures above 150° C. for periods of 10 to 48 hours. It has now been discovered that the drying of coagulated dispersion polytetrafluoroethylene powder when carried out at temperatures below 170° C. and for times not exceeding 45 minutes, and preferably at a temperature of 150° C. for a period of 30 minutes, results in an extrusion powder which can be reproducibly extruded at significantly higher extrusion rates and with less flaws than polymer dried by the methods heretofore generally employed.

In order to obtain a dry polymer at these relatively low drying temperatures and within the short drying times specified, it is necessary that the polymer be dried in a moving inert gas stream, which continuously removes the moisture evaporating from the polymer. It is furthermore essential that the polymer be dried as a relatively thin layer of polymer powder, and that the inert gas stream be passed through that bed of polymer powder. In the most practical embodiment of the present invention the drying process is carried out on a continuous scale in which a moving bed of polymer powder passes through a circulating dry air oven in which the air is heated to a temperature above 120° to 170° C. and where the air passes through the polymer bed. In general it has been found necessary to employ a polymer powder bed of not greater than ¾ in. thickness and a hot air velocity of above 100 ft./min. in order to dry the polymer at the temperature conditions found essential to obtaining the improved extrusion powder of the present invention.

Aqueous dispersions of polytetrafluoroethylene are prepared by methods described in the literature. Thus U.S. Patent 2,559,752, U.S. Patent 2,612,484 and U.S. Patent 2,750,350 describe methods of obtaining the aqueous polytetrafluoroethylene dispersions. These dispersions contain approximately 13 to approximately 35% of polymer based on the weight of the total composition. The dispersion is coagulated by various means also described in the literature. A preferred method of coagulating the polymer, which gives rise to a polymer powder suitable for extrusion applications is described in U.S. Patent 2,593,583. The coagulated powder obtained in this manner is separated from the mother liquid and then dried in accordance with the present invention.

From the dried powder a suitable pressure coalescing extrusion composition is prepared by intimately admixing the polytetrafluoroethylene powder with an organic lubricant having a viscosity of at least .45 centipoise at 25° C., said lubricant being liquid under the conditions of subsequent extrusion and present in an amount of 5 to 50% based on the combined weight of the polytetrafluoroethylene and lubricant. The lubricant is preferably a saturated aliphatic or cycloaliphatic hydrocarbon having the above-indicated viscosity. In the typical extrusion, the pressure coalescing lubricated polymer mixture is fed into the extrusion cylinder of a plastic extrusion machine. The mixture is forced under pressure through an extrusion die which is maintained at a temperature of 25° to 150° C. The lubricant in the resulting extruded article is removed either by volatilization or extraction. When substantially all of the lubricant has been removed, the characteristics. A 900 g. sample of the polymer was lubricated by admixing it with 19 weight percent, based on the total composition, of 2 V.M. & P. naphtha, a commercial hydrocarbon lubricant. The mixture was placed in a closed glass jar and rolled for a period of 30 minutes at a rate of 30 minutes at a rate of 30 r.p.m. to distribute the lubricant evenly throughout the polymer.

The resulting mixture was placed in an extrusion cylinder and extruded at a constant rate of 20 feet per minute, through a tapered 1/16" die at a cylinder cross-section reduction ratio of 400. The pressure required to push the polymer through the die was measured and is reported in the table below. The 1.25" diameter cylinder was maintained at a temperature of 30° C. Extrusion pressures below 3000 p.s.i. indicate a polymer of outstanding extrusion characteristics.

*Table I*

| Test No. | Dry Polymer, Wt. in # | Drying Temp., °C. | Air Velocity Through Pol. Bed in ft./min. | Polymer Bed Depth in in. | Drying Time | Initial Moisture, Percent Dry Basis | Final Moisture, Percent | Extrusion Pressure in p.s.i. |
|---|---|---|---|---|---|---|---|---|
| 1 | | 150 | | | 10 hrs | | | 3,580 |
| 2 | 1.5 | 150 | 250 | 0.25 | 30 min | 87 | 0.012 | 2,875 |
| 3 | 3.0 | 150 | 100 | 0.25 | 40 min | 84 | 0.03 | 3,050 |
| 4 | 1.3 | 150 | 500 | 0.5 | 40 min | 115 | 0.015 | 2,050 |
| 5 | 2.8 | 150 | 250 | 0.5 | 60 min | 100 | 0.021 | 2,800 |
| 6 | 1.55 | 150 | 500 | 0.5 | 120 min | 81 | 0.005 | 3,100 |
| 7 | 4.6 | 150 | 250 | 0.75 | 60 min | 83 | 0.008 | 2,700 |
| 8 | 2.1 | 150 | 500 | 0.75 | 120 min | 100 | 0.005 | 3,140 |
| 9 | 0.8 | 150 | 500 | 0.25 | 20 min | 75 | 0.015 | 2,575 |
| 10 | 1.4 | 130 | 500 | 0.5 | 40 min | 75 | 0.016 | 2,600 |
| 11 | 3.2 | 130 | 250 | 0.5 | 60 min | 75 | 0.025 | 2,200 |
| 12 | 9.9 | 130 | 100 | 0.75 | 120 min | 70 | 0.005 | 3,100 |
| 13 | 0.75 | 130 | 500 | 0.25 | 30 min | 87 | 0.035 | 2,450 |
| 14 | 8.7 | 170 | 100 | 0.75 | 120 min | 95 | 0.02 | 3,425 |
| 15 | 0.6 | 170 | 500 | 0.27 | 120 min | 133 | 0.005 | 3,650 |
| 16 | 0.75 | 170 | 500 | 0.25 | 20 min | 87 | 0.032 | 2,800 |
| 17 | 0.6 | 170 | 250 | 0.025 | 30 min | 75 | 0.012 | 2,900 |
| 18 | 2.2 | 190 | 500 | 0.075 | 45 min | 111 | 0.005 | 3,760 |
| 19 | 3.9 | 190 | 500 | 1.0 | 120 min | 84 | 0.005 | 3,375 | extruded article is passed through a sintering oven or bath maintained at a temperature of above 327° C. until all of the polymer is sintered. The sintering step coalesces the polymer particles into a strong uniform article. The sintering may be followed by plunging the polymer in water or other coolant liquids or gases to yield smooth-surfaced articles, or in some cases it may be beneficial to anneal the extruded article instead of quenching it. The process of extruding polytetrafluoroethylene is described in greater detail in U.S. Patent 2,685,707.

The present invention is further illustrated by the following examples.

EXAMPLE I

An aqueous dispersion of polytetrafluoroethylene containing 35% of polytetrafluoroethylene on the basis of the total composition was diluted with additional water until a concentration of 12% was obtained. The diluted dispersion was subjected to a flat-plate agitator maintained at a speed of 260 r.p.m. for a period of approximately 3 minutes. The polymer coagulated and was agitated an additional 6 minutes. It was then separated from the mother liquid and repeatedly washed and drained. Wet polytetrafluoroethylene was loaded onto trays having an area of 6 sq. ft. and evenly distributed on the tray. The trays, which were equipped with a porous bottom, were placed in a Lydon oven; heated air was then passed through a tray containing the polymer. The Table I below summarizes the drying conditions employed, i.e., drying temperature, polymer bed depth, air velocity through tray, drying time, initial moisture-based on the dry polymer, and final moisture. The drying time of the polymer was established by weighing the polymer after 10, 20, 30, 40, 45, 60, 90 and 120 minutes; the drying was continued until the polymer had the same weight after 2 consecutive weighings. The dried polymer was then evaluated with respect to its extrusion Polymer dried in a 150° oven, where air was not passed through the polymer and which required 10 hours to completely dry the polymer, gave rise to extrusion pressures of 3500 to 4000 p.s.i. in the above described extrusion test.

EXAMPLE II

A 35% aqueous dispersion of polytetrafluoroethylene was coagulated as described in Example I. The coagulated, washed polymer was placed on a 6 sq. ft. tray having a porous bottom and dried in a Lydon oven at a temperature of 150° C. employing an air velocity of 500 ft. per minute for a period of 30 minutes. The polymer was spread on the tray to a thickness of ½ in. The resulting polymer was lubricated as disclosed in Example I, and then employed in the coating of wire in a Jennings wire extruder, Model TF–1. E–22 U.S. military specification wire (M–12–W–16878F/F (Navy)) was coated with a 10 mil layer of the lubricated polytetrafluoroethylene powder at the rate of 25 ft. per minute according to the method disclosed in the article of F. R. Snelling and R. D. De Young in "Wire and Wire Products" of June 1957. The wire coating was then repeated with coagulated polytetrafluoroethylene dried at 150° C. for a period of 10 hours without passing air through the polymer. Employing the 30 minute dried polymer there was obtained an average length of flaw free wire of 200 ft. Employing the 10 hour dried polymer, the average length of flaw free wire obtained under identical conditions was 150 ft.

The examples hereinabove have shown the criticality of the drying conditions employed in the preparation of polytetrafluoroethylene extrusion powder. The improved properties resulting from using the drying conditions of the present invention have also been demonstrated.

Polymer dried in accordance with the present invention is highly useful in the extrusion of film, fiber, tubing, pipe and similar articles. A particularly useful and valuable application for the polymers dried in accordance with the present invention is the coating of wire.

I claim:

1. In a process for preparing extruded polytetrafluoroethylene articles, the step which comprises passing an inert gas stream at a velocity of at least 100 ft./min. and at a temperature of 120 to 170° C. through polytetrafluoroethylene powder obtained by coagulation of aqueous dispersions of polytetrafluoroethylene, said polymer powder being maintained in a layer not exceeding 0.75 inch and reducing the moisture content thereof to below 0.05%.

2. In a process for preparing extruded polytetrafluoroethylene articles, the step which comprises passing an inert gas stream at a velocity of 500 ft./min. and at a temperature of 120° to 170° C. through polytetrafluoroethylene powder obtained by coagulation of aqueous polytetrafluoroethylene dispersions, said polymer powder being maintained in a layer not exceeding 0.5 inch for a period of 30 minutes.

References Cited in the file of this patent

UNITED STATES PATENTS

| | | |
|---|---|---|
| 2,535,829 | Beck | Dec. 26, 1950 |
| 2,613,450 | Nichols et al. | Oct. 14, 1952 |
| 2,685,707 | Llewellyn et al. | Aug. 10, 1954 |
| 2,782,174 | Hetherington et al. | Feb. 19, 1957 |
| 2,782,179 | Lontz | Feb. 19, 1957 |

UNITED STATES PATENT OFFICE
Certificate

Patent No. 2,931,106                                                              Patented April 5, 1960

David R. Campbell

Application having been made jointly by David R. Campbell, the inventor named in the patent above identified, and E. I. du Pont de Nemours and Company, Wilmington, Delaware, a corporation of Delaware, the assignee, and John E. Eldridge of Newark, New Castle County, Delaware, for the issuance of a certificate under the provisions of Title 35, Section 256 of the United States Code, adding the name of the said John E. Eldridge to the patent as a joint inventor, and a showing and proof of facts satisfying the requirements of the said section having been submitted, it is this 13th day of June 1961, certified that the name of the said John E. Eldridge is hereby added to the said patent as a joint inventor with the said David R. Campbell.

[SEAL]

ARTHUR W. CROCKER,
*First Assistant Commissioner of Patents.*